(12) United States Patent
Chopra et al.

(10) Patent No.: US 8,126,987 B2
(45) Date of Patent: Feb. 28, 2012

(54) MEDIATION OF CONTENT-RELATED SERVICES

(75) Inventors: Vivek Chopra, Fremont, CA (US);
David Gaxiola, San Jose, CA (US);
James Marr, Burlingame, CA (US);
Stephen Detwiler, Oakland, CA (US);
Hirotoshi Maegawa, Tokyo (JP); Shin Iima, Tokyo (JP)

(73) Assignee: Sony Computer Entertainment Inc. (JP)

( * ) Notice: Subject to any disclaimer, the term of this patent is extended or adjusted under 35 U.S.C. 154(b) by 136 days.

(21) Appl. No.: 12/690,051

(22) Filed: Jan. 19, 2010

(65) Prior Publication Data

US 2011/0119345 A1 May 19, 2011

Related U.S. Application Data

(60) Provisional application No. 61/261,691, filed on Nov. 16, 2009, provisional application No. 61/261,652, filed on Nov. 16, 2009.

(51) Int. Cl.
*G06F 15/16* (2006.01)
(52) U.S. Cl. .......... 709/217; 709/220; 709/229
(58) Field of Classification Search .......... 709/200–203, 709/217–229, 230
See application file for complete search history.

(56) References Cited

U.S. PATENT DOCUMENTS

| | | | |
|---|---|---|---|
| 6,360,266 B1 * | 3/2002 | Pettus | 709/227 |
| 7,257,623 B2 * | 8/2007 | Viavant et al. | 709/220 |
| 7,305,431 B2 | 12/2007 | Karnik et al. | |
| 7,313,810 B1 | 12/2007 | Bell et al. | |
| 7,320,131 B1 | 1/2008 | O'Toole, Jr. | |
| 7,333,864 B1 | 2/2008 | Herley | |
| 7,343,141 B2 | 3/2008 | Ellis et al. | |
| 7,359,979 B2 | 4/2008 | Gentle et al. | |
| 7,466,823 B2 | 12/2008 | Vestergaard et al. | |
| 7,475,219 B2 | 1/2009 | O'Connor et al. | |
| 7,574,488 B2 | 8/2009 | Matsubara | |
| 7,587,465 B1 | 9/2009 | Muchow | |
| 7,613,633 B1 | 11/2009 | Woolston | |
| 7,711,847 B2 | 5/2010 | Dhupelia et al. | |
| 7,716,238 B2 | 5/2010 | Harris | |
| 7,720,908 B1 | 5/2010 | Newson et al. | |
| 7,730,206 B2 | 6/2010 | Newson et al. | |
| 7,792,902 B2 | 9/2010 | Chatani et al. | |
| 7,822,809 B2 | 10/2010 | Dhupelia et al. | |
| 7,831,666 B2 | 11/2010 | Chatani et al. | |
| 7,908,362 B2 * | 3/2011 | Ferguson et al. | 709/224 |
| 2001/0007981 A1 | 7/2001 | Woolston | |

(Continued)

OTHER PUBLICATIONS

"Transmission Control Protocol", Wikipedia, the free encyclopedia, Publication Date unknown/ Accessed Jun. 4, 2007, http://en.wikipedia.org/wiki/Transmission_Control_Protocol#Ordered_data_transfer.2C_Retransmission_of_lost_packets_.26_Discarding_duplicat.

(Continued)

*Primary Examiner* — Moustafa M Meky
(74) *Attorney, Agent, or Firm* — Carr & Ferrell LLP

(57) ABSTRACT

Systems and methods for mediation of content-related services are provided. A client device playing content may send a request for a service related to the content. Configuration information is generated for the client device, reflecting a set of permissions that are determined based on a market segment of the client device. Once the client device is configured according to the set of permissions, the client device can communicate with a service provider of the requested service. Such communication and any further activity regarding the service is governed by the set of permissions, as is reporting regarding such communication and activity

26 Claims, 3 Drawing Sheets

US 8,126,987 B2

Page 2

U.S. PATENT DOCUMENTS

| | | |
|---|---|---|
| 2001/0009868 A1 | 7/2001 | Sakaguchi et al. |
| 2001/0014891 A1 | 8/2001 | Hoffert et al. |
| 2001/0020295 A1 | 9/2001 | Satoh |
| 2001/0025256 A1 | 9/2001 | Oliphant et al. |
| 2001/0027561 A1 | 10/2001 | White et al. |
| 2001/0027563 A1 | 10/2001 | White et al. |
| 2001/0034721 A1 | 10/2001 | Boudreau et al. |
| 2001/0037466 A1 | 11/2001 | Fukutake et al. |
| 2001/0042021 A1 | 11/2001 | Matsuo et al. |
| 2001/0044339 A1 | 11/2001 | Cordero et al. |
| 2001/0051996 A1 | 12/2001 | Cooper et al. |
| 2002/0016922 A1 | 2/2002 | Richards et al. |
| 2002/0035604 A1 | 3/2002 | Cohen et al. |
| 2002/0037699 A1 | 3/2002 | Kobayashi et al. |
| 2002/0041584 A1 | 4/2002 | Sashihara |
| 2002/0042830 A1 | 4/2002 | Bose et al. |
| 2002/0046232 A1 | 4/2002 | Adams et al. |
| 2002/0049086 A1 | 4/2002 | Otsu |
| 2002/0052816 A1 | 5/2002 | Clenaghan et al. |
| 2002/0060994 A1 | 5/2002 | Kovacs et al. |
| 2002/0062348 A1 | 5/2002 | Maehiro |
| 2002/0075844 A1 | 6/2002 | Hagen |
| 2002/0077988 A1 | 6/2002 | Sasaki et al. |
| 2002/0082077 A1 | 6/2002 | Johnson et al. |
| 2002/0082997 A1 | 6/2002 | Kobata et al. |
| 2002/0103855 A1 | 8/2002 | Chatani |
| 2002/0104019 A1 | 8/2002 | Chatani et al. |
| 2002/0114455 A1 | 8/2002 | Asahi et al. |
| 2002/0115488 A1 | 8/2002 | Berry et al. |
| 2002/0116206 A1 | 8/2002 | Chatani |
| 2002/0116275 A1 | 8/2002 | Woolston |
| 2002/0116283 A1 | 8/2002 | Chatani |
| 2002/0116471 A1 | 8/2002 | Shteyn |
| 2002/0116479 A1 | 8/2002 | Ishida et al. |
| 2002/0120925 A1 | 8/2002 | Logan |
| 2002/0122052 A1 | 9/2002 | Reich et al. |
| 2002/0129094 A1 | 9/2002 | Reisman |
| 2002/0133707 A1 | 9/2002 | Newcombe |
| 2002/0143781 A1 | 10/2002 | Lavoie et al. |
| 2002/0161709 A1 | 10/2002 | Floyd et al. |
| 2002/0188360 A1 | 12/2002 | Muramori et al. |
| 2002/0196940 A1 | 12/2002 | Isaacson et al. |
| 2002/0198929 A1 | 12/2002 | Jones et al. |
| 2002/0198930 A1 | 12/2002 | Jones et al. |
| 2003/0014759 A1 | 1/2003 | Van Stam |
| 2003/0018719 A1 | 1/2003 | Ruths et al. |
| 2003/0018797 A1 | 1/2003 | Dunning et al. |
| 2003/0023910 A1 | 1/2003 | Myler et al. |
| 2003/0032486 A1 | 2/2003 | Elliott |
| 2003/0037033 A1 | 2/2003 | Nyman et al. |
| 2003/0037150 A1 | 2/2003 | Nakagawa |
| 2003/0055892 A1 | 3/2003 | Huitema et al. |
| 2003/0073494 A1 | 4/2003 | Kalpakian et al. |
| 2003/0076842 A1 | 4/2003 | Johansson et al. |
| 2003/0119537 A1 | 6/2003 | Haddad |
| 2003/0135513 A1 | 7/2003 | Quinn et al. |
| 2003/0152034 A1 | 8/2003 | Zhang et al. |
| 2003/0189587 A1 | 10/2003 | White et al. |
| 2003/0190960 A1 | 10/2003 | Jokipii et al. |
| 2003/0208621 A1 | 11/2003 | Bowman |
| 2003/0216824 A1 | 11/2003 | Chu et al. |
| 2003/0217135 A1 | 11/2003 | Chatani et al. |
| 2003/0217158 A1 | 11/2003 | Datta |
| 2003/0237097 A1 | 12/2003 | Marshall et al. |
| 2004/0003039 A1 | 1/2004 | Humphrey et al. |
| 2004/0024879 A1 | 2/2004 | Dingman et al. |
| 2004/0030787 A1 | 2/2004 | Jandel et al. |
| 2004/0034536 A1 | 2/2004 | Hughes |
| 2004/0034691 A1 | 2/2004 | Tanimoto |
| 2004/0049086 A1 | 3/2004 | Muragaki et al. |
| 2004/0053690 A1 | 3/2004 | Fogel et al. |
| 2004/0057348 A1 | 3/2004 | Shteyn et al. |
| 2004/0059711 A1 | 3/2004 | Jandel et al. |
| 2004/0063458 A1 | 4/2004 | Hori et al. |
| 2004/0078369 A1 | 4/2004 | Rothstein et al. |
| 2004/0105401 A1 | 6/2004 | Lee |
| 2004/0111141 A1 | 6/2004 | Brabec et al. |
| 2004/0117443 A1 | 6/2004 | Barsness |
| 2004/0123306 A1 | 6/2004 | Gazda et al. |
| 2004/0131255 A1 | 7/2004 | Ben-Yaacov et al. |
| 2004/0133512 A1 | 7/2004 | Woolston |
| 2004/0139228 A1 | 7/2004 | Takeda et al. |
| 2004/0160943 A1 | 8/2004 | Cain |
| 2004/0162059 A1 | 8/2004 | Hiltunen et al. |
| 2004/0172476 A1 | 9/2004 | Chapweske |
| 2004/0216125 A1 | 10/2004 | Gazda et al. |
| 2004/0233855 A1 | 11/2004 | Gutierrez et al. |
| 2004/0240457 A1 | 12/2004 | Habetha et al. |
| 2004/0266336 A1 | 12/2004 | Patsiokas et al. |
| 2005/0018312 A1 | 1/2005 | Gruner et al. |
| 2005/0021398 A1 | 1/2005 | McCleskey et al. |
| 2005/0021470 A1 | 1/2005 | Martin et al. |
| 2005/0028197 A1 | 2/2005 | White et al. |
| 2005/0033655 A1 | 2/2005 | Woolston |
| 2005/0034162 A1 | 2/2005 | White et al. |
| 2005/0036616 A1 | 2/2005 | Huang et al. |
| 2005/0044568 A1 | 2/2005 | White et al. |
| 2005/0066219 A1 | 3/2005 | Hoffman et al. |
| 2005/0066358 A1 | 3/2005 | Anderson et al. |
| 2005/0071807 A1 | 3/2005 | Yanavi |
| 2005/0076379 A1 | 4/2005 | White et al. |
| 2005/0086287 A1 | 4/2005 | Datta |
| 2005/0086288 A1 | 4/2005 | Datta et al. |
| 2005/0086329 A1 | 4/2005 | Datta et al. |
| 2005/0086350 A1 | 4/2005 | Mai |
| 2005/0086369 A1 | 4/2005 | Mai et al. |
| 2005/0093868 A1 | 5/2005 | Hinckley |
| 2005/0097386 A1 | 5/2005 | Datta et al. |
| 2005/0105526 A1 | 5/2005 | Stiemerling et al. |
| 2005/0157749 A1 | 7/2005 | Lee et al. |
| 2005/0182937 A1 | 8/2005 | Bedi |
| 2005/0188373 A1 | 8/2005 | Inoue et al. |
| 2005/0198296 A1 | 9/2005 | Teodosiu et al. |
| 2005/0198388 A1 | 9/2005 | Teodosiu et al. |
| 2005/0251577 A1 | 11/2005 | Guo et al. |
| 2005/0254366 A1 | 11/2005 | Amar |
| 2005/0259637 A1 | 11/2005 | Chu et al. |
| 2005/0262411 A1 | 11/2005 | Vertes et al. |
| 2005/0286426 A1 | 12/2005 | Padhye et al. |
| 2006/0075127 A1 | 4/2006 | Juncker et al. |
| 2006/0100020 A1 | 5/2006 | Kasai |
| 2006/0123053 A1 | 6/2006 | Scannell, Jr. |
| 2006/0133328 A1 | 6/2006 | Levendel et al. |
| 2006/0143650 A1 | 6/2006 | Tanikawa et al. |
| 2006/0146704 A1 | 7/2006 | Ozer et al. |
| 2006/0195748 A1 | 8/2006 | Chen et al. |
| 2006/0227372 A1 | 10/2006 | Takayanagi |
| 2006/0247011 A1 | 11/2006 | Gagner |
| 2006/0253595 A1 | 11/2006 | Datta |
| 2006/0256210 A1 | 11/2006 | Ryall et al. |
| 2006/0259637 A1* | 11/2006 | Kotchavi et al. .............. 709/223 |
| 2006/0288103 A1 | 12/2006 | Gobara et al. |
| 2007/0046669 A1 | 3/2007 | Choi et al. |
| 2007/0047912 A1 | 3/2007 | Hattori et al. |
| 2007/0058792 A1 | 3/2007 | Chaudhari et al. |
| 2007/0061460 A1 | 3/2007 | Khan et al. |
| 2007/0076729 A1 | 4/2007 | Takeda |
| 2007/0078002 A1 | 4/2007 | Evans et al. |
| 2007/0078706 A1 | 4/2007 | Datta et al. |
| 2007/0082674 A1 | 4/2007 | Pedersen et al. |
| 2007/0086033 A1 | 4/2007 | Tu |
| 2007/0096283 A1* | 5/2007 | Ljung et al. ................... 257/686 |
| 2007/0097959 A1 | 5/2007 | Taylor |
| 2007/0101369 A1 | 5/2007 | Dolph |
| 2007/0118281 A1 | 5/2007 | Adam et al. |
| 2007/0146347 A1 | 6/2007 | Rosenberg |
| 2007/0165629 A1 | 7/2007 | Chaturvedi et al. |
| 2007/0191109 A1 | 8/2007 | Crowder et al. |
| 2007/0192382 A1 | 8/2007 | Harris |
| 2007/0198528 A1 | 8/2007 | Harris |
| 2007/0208748 A1 | 9/2007 | Li |
| 2007/0217436 A1 | 9/2007 | Markley et al. |
| 2007/0259650 A1 | 11/2007 | Felder |
| 2007/0265089 A1 | 11/2007 | Robarts et al. |
| 2008/0013724 A1 | 1/2008 | Shamoon et al. |
| 2008/0044162 A1 | 2/2008 | Okada et al. |
| 2008/0046266 A1 | 2/2008 | Gudipalley et al. |

| | | | |
|---|---|---|---|
| 2008/0102947 A1 | 5/2008 | Hays et al. | |
| 2008/0119286 A1 | 5/2008 | Brunstetter et al. | |
| 2008/0153517 A1 | 6/2008 | Lee | |
| 2008/0259042 A1 | 10/2008 | Thorn | |
| 2008/0280686 A1 | 11/2008 | Dhupelia et al. | |
| 2008/0301318 A1 | 12/2008 | McCue et al. | |
| 2008/0307103 A1 | 12/2008 | Marr et al. | |
| 2008/0307412 A1 | 12/2008 | Marr et al. | |
| 2009/0011835 A1 | 1/2009 | Hansen et al. | |
| 2009/0077245 A1 | 3/2009 | Smelyansky et al. | |
| 2009/0100454 A1 | 4/2009 | Weber | |
| 2009/0138610 A1 | 5/2009 | Gobara et al. | |
| 2009/0150525 A1* | 6/2009 | Edgett et al. | 709/220 |
| 2009/0240821 A1 | 9/2009 | Juncker et al. | |
| 2009/0315766 A1 | 12/2009 | Khosravy et al. | |
| 2010/0083189 A1 | 4/2010 | Arlein et al. | |
| 2010/0156812 A1 | 6/2010 | Stallings et al. | |
| 2011/0010545 A1 | 1/2011 | Kill et al. | |
| 2011/0047598 A1* | 2/2011 | Lindley et al. | 726/4 |

OTHER PUBLICATIONS

"User Datagram Protocol", Wikipedia, the free encyclopedia, Publication date unknown/ Accessed Jun. 4, 2007, http://en.wikipedia.org/wiki/User_Datagram_Protocol#Difference_between_TCP_and _ UDP.

Adya et al., "A Multi-Radio Unification Protocol for IEEE 802.11 Wireless Networks", Microsoft Technical Report MSR-RT-2003-44, Jul. 2003.

Aronson, "Using Groupings for Networked Gaming", Gamasutra.com, Jun. 21, 2000.

Allen, Arthur D., "Optimal Delivery of Multi-Media Content over Networks", Burst.com Inc., Mar. 15, 2001, San Francisco, CA, USA.

Bahl et al., "SSCH: Slotted Seeded Channel Hopping for Capacity Improvement in IEEE 802.11 Ad-Hoc Wireless Networks", ACM MobiCom, Philadelphia, PA, Sep. 2004.

Boulic et al., "Integration of Motion Control Techniques for Virtual Human and Avatar Real-time Animation", Swiss Federal Institute of Technology, Lausanne, Switzerland, Sep. 1997.

Carter et al., "An Efficient Implementation of Interactive Video-on-Demand," Proc. of the 8th Intl. Symp. on Modeling, Analysis & Simulation etc., IEEE, 2000.

Cavin et al., "On the Accuracy of MANET Simulators", ACM, Toulouse, France, Oct. 2002.

Chin et al., "Implementation Experience with MANET Routing Protocols", ACM SIGCOMM, Nov. 2002.

Chiueh, Tzi-cker, "Distributed Systems Support for Networked Games," Computer Science Department, State University of new york at Stony Brook, Stony Brook, NY, May 1997.

Cisco Systems, Inc., "Network Flow Management: Resource Reservation for Multimedia Flows", Mar. 19, 1999.

Corson, et al., "Internet-Based Mobile Ad Hoc networking", IEEE Internet Computing, 1999.

Diot, et al., "Adistributed Architecture for Multiplayer Interactive Applications on the Internet," IEEE vol. 13, Issue 4, Aug. 1999.

Draves, et al. "Comparison of Routing Metrics for Static Multi-Hop Wireless Networks", ACM SIGCOMM, Portland, OR, Aug. 2004.

Draves et al., "Routing in Multi-Radio, Multi-Hop Wireless Mesh Networks", ACM MobiCom, Philadelphia, PA, Sep. 2004.

European Search Report for EP 03 72 1413, Jun. 30, 2005.

F. Audet, NAT Behavioral Requirements for Unicast UDP, Behave Internet-Draft, Jul. 15, 2005.

Festa et al., "Netscape Alumni to Launch P2P Company", Aug. 2, 2001.

Gelman et al., "A Store and Forward Architecture for Video-on-Demand Service," Proc. IEEE ICC, IEEE Press; Piscataway, N.J., 1991, pp. 27.3.1-27.3.5.

Hagsand, O: "Interactive Multiuser Ves in the DIVE System", IEEE Multimedia, IEEE Service Center, New York, NY, US vol. 3, No. 1, Mar. 21, 1996, pp. 30-39, XP000582951 ISSN:1070-986X.

Hanada, "The Design of Network Game and DirecPlay", Inside Windows, Softbank K.K., vol. 4, No. 4, pp. 42-57, Apr. 1, 1998.

Holland, et al., "A Rate-Adaptive MAC Protocol for Multi-Hop Wireless Networks", ACM MobiCom 2001, Rome, Italy, Jul. 2001.

Hua et al., "Patching: A Multicast Technique for True Video-on-Demand Services," Proceedings of the ACM Multimedia 98, Sep. 12, 1998, pp. 191-200.

Rosenberg, J., Interactive Connectivity Establishment (ICE); A Methodology for Network Address Translator (NAT) Traversal for Multimedia Session Establishment Protocols, Mmusic Internet-Draft, Oct. 25, 2004.

Rosenberg, J, Interactive Connectivity Establishment (ICE); A Methodology for Network Address Translator (NAT) Traversal for Offer/Answer Protocols, Mmusic Internet-Draft, Jan. 16, 2007.

Rosenberg, J Interactive Connectivity Establishment (ICE); A Methodology for Network Address Translator (NAT) Traversal for Offer/Answer Protocols, Mmusic Internet-Draft, Jul. 17, 2005.

Rosenberg, J., Simple Traversal of UDP Through Network Address Translators (NAT), Behave Internet-Draft, Jul. 17, 2005.

Rosenberg, J., Stun—Simple Traversal of User Datagram Protocols (UDP) Through Network Address Translators (NATs), Network Working Group, Mar. 2003.

Rosenberg, J., Traversal Using Relay Nat (TURN), MIDCOM Internet-Draft, Oct. 20, 2003.

Rosenberg, J., Interactive Connectivity Establishment (ICE):A Methodology for Network Address Translator (NAT) Traversal for Multimedia Session Establishment Protocols, Mmusic Internet-Draft, Jul. 19, 2004.

Jain et al., "Impact of Interference on Multi-hop Wireless Network Performance", ACM MobiCom, San Diego, CA, Sep. 2003.

Reimer, J., "Cross-Platform Game Development and the next Generation of Consoles," Nov. 7, 2005, Ars Technica LLC.

Jones, "The Microsoft Interactive TV System: An Experience Report," Technical Report MSR-TR-97-18, Jul. 1997.

Kooser, "The Mesh Pit: Taking Wireless Networks to the Next Level", Entrepreneur Magazine, May 2004.

Kramer et al., "Tutorial: Mobile Software Agents for Bynamic Routing", MIT Lab, Mar. 1999.

Packethop, Inc., "Connectivity that Moves You: PacketHop Mobile Mesh Networking", Belmont, California, Copyright 2003.

Pinho et al.; GloVE: A Distributed Environment for Low Cost Scalable VoD Systems; Oct. 28-30, 2002; IEEE; Proceedings of the 14th Symposium on Computer Architecture and High Performance Computing.

Qiu et al., "Optimizing the Placement of Integration Points in Multi-Hop Wireless Networks", IEEE ICNP 2004.

Qiu et al., "Troubleshooting Multihop Wireless Networks", Microsoft Technical Report, Microsoft Research-TR-2004-1, Nov. 2001.

Shareaza; May 27, 2003.

Tran et al.; ZIGZAG: An Efficient Peer-to-Peer Scheme for Media Streaming; Mar. 30-Apr. 3, 2003.

University of Rochester, "Computer Networks—Introduction", CSC 257/457 (Fall 2002), Sep. 9, 2002.

Wattenhofer et al., "Distributed Topology Control for Power Efficient Operation in Multihop Wireless Ad Hoc Networks," IEEE INFOCOM 2001.

White et al. "How Computers Work", Oct. 2003, Que, 7th Edition.

Takeda, Y., Symmetric NAT Traversal Using STUN, Internet engineering Task Force, Jun. 2003.

"Brief for Appellants", In re Masayuki Chatani et al., U.S. Court of Appeals for the Federal Circuit (2007-1150) (Mar. 23, 2007).

"Brief for Appellee", In re Masayuki Chatani et al., U.S. Court of Appeals for the Federal Circuit (2007-1150) (May 21, 2007).

"How Network Load Balancing Technology Works", Microsoft TechNet, Mar. 28, 2003, 2007 Microsoft Corporation, http://technet2.microsoft.com/windowsserver/en/library/1611 cae3-5865-4897-a186-7.

"Image:TCP State diagram.jpg", Wikipedia, the free encyclopedia, Publication date unknown/ Accessed Jun. 4, 2007, http://en.wikipedia.org/wiki/IMage:TCP_state_diagram.jpg.

"In Re Masayuki Chatani and Glen Van Datta", U.S. Court of Appeals for the Federal Circuit, 2007-1150 (U.S. Appl. No. 11/221,128), Nov. 19, 2007.

"Multicast over TCP/IP HOWTO: Multicast Transport Protocols.", Mar. 20, 1998, http://www.tldp.org/HOWTO/Multicast-HOWTO-9.html.

"Petition for Panel Rehearing," In Re Masayuki Chatani and Glen Van Datta, Appeal From the United States Patent and Trademark Office, Board of Patent Appeals and Interferences, In the United States Court of Appeals for the Federal Circuit, 2007-1150 (U.S. Appl. No. 10/211,128), Jan. 3, 2008.

"Reliable User Datagram Protocol", Wikipedia, the free encyclopedia, Publication date unknown/ Accessed Jun. 4, 2007, http://en.wikipedia.org/wiki/Reliable_User_Datagram_Protocol.

"Reply Brief of Appellants", In re Masayuki Chatani et al., U.S. Court of Appeals for the Federal Circuit (2007-1150) (Jun. 4, 2007).

"Streaming Media", Wikipedia, the free encyclopedia, Publication date unknown/ Accessed Jun. 4, 2007, http://en.wikipedia.org/wiki/Streaming_media#Protocol_issues.

* cited by examiner

US 8,126,987 B2

MEDIATION OF CONTENT-RELATED SERVICES

CROSS-REFERENCE TO RELATED APPLICATIONS

The present application claims the priority benefit of U.S. provisional application No. 61/261,691 filed Nov. 16, 2009 and U.S. provisional application No. 61/261,652 filed Nov. 16, 2009. The present application is related to U.S. patent application Ser. No. 11/759,155 filed Jun. 6, 2007 and entitled "Cached Content Consistency Management"; U.S. patent application Ser. No. 11/759,143 filed Jun. 6, 2007 and entitled "Mediation for Auxiliary Content in an Interactive Environment;" and U.S. patent application Ser. No. 12/690,048 filed concurrently herewith and entitled "Mediation of Online Trading Services." The disclosure of each these applications is incorporated herein by reference.

BACKGROUND OF THE INVENTION

1. Field of the Invention

The present invention generally relates to mediation of services. More specifically, the present invention relates to the mediation of services related to content provided by third-party service providers.

2. Background of the Related Art

Digital content encompasses a range of audio, video, video games, and software applications. Such content is typically sold or transferred via download over a communications network or on some form of digital storage media including optical discs such as a compact disc (CD) or digital versatile disc (DVD). Content may also be sold or transferred via the likes of non volatile memory such as flash memory.

Digital content may be played on computing devices, media players, and/or game consoles. Because such devices may have access to a communication network such as the Internet, various services associated with the digital content may be provided via the communication network to update, upgrade, or otherwise supplement the content following the original sale or transfer of the content. Such services may include supplemental content, ancillary content, customization of content, as well as the option to upgrade certain content.

Certain content providers do not have the resources, rights, or expertise to supplement the content that they provide. Other content providers may not wish to focus their energies and resources on supplementing content following its release, but still offer the opportunity for supplementing that content. In order to enhance the enjoyment, utility, and corresponding desirability of their content—or the content of others—content providers may allow for services supplementing the content to be provided by third-party service providers.

For example, game players playing a particular game title may wish to customize the appearance of their game characters. A game developer may not wish or may not be able to provide such customization itself, but it may allow other service providing entities to offer that ability to the game players. The consuming public is also unlikely to be interested in 'stale' or out-of-date content. For example, a DVD stamped with a series of movie previews quickly becomes out-of-date when the previewed movies are released and subsequently end their theatrical run. Notwithstanding, the advertisement remains embedded on the disc. Various gaming systems suffer from similar drawbacks in that service information such as advertising embedded on a game disc may soon become irrelevant.

Consumer demand for timely, relevant, or otherwise pertinent services is a critical component of digital media delivery. The corresponding need of service providers for statistical information related to user activity as that activity relates to a service is a similarly critical if not complicated component related to content delivery. There is a need in the art for mediation of content-related services provided by third-party service providers.

SUMMARY OF THE INVENTION

Embodiments of the invention provided for mediation of content-related services. A client device playing content may send a request for a service related to the content. Configuration information is generated for the client device, reflecting a set of permissions that are determined based on a market segment of the client device. Market segment may refer to geographic location, region, type of client device, content title, user information (e.g., language), and/or various combinations of the foregoing. Once the client device is configured according to the set of permissions, the client device can communicate with a service provider of the requested service. Such communication and any further activity regarding the service are governed by the set of permissions, as is reporting regarding such activity.

Various embodiments of the present invention may include methods for mediation of content-related services. Such methods may include receiving a request concerning a service associated with content played on a client device, determining a set of permissions for the requested service based on a market segment of the client device requesting the service, generating configuration information based on the determined set of permissions, and providing the configuration information for download to the client device. Configuration of the client device based on the configuration information allows for communication between the client device and a service provider of the requested service in accordance with the set of permissions. Further, methods may include compiling partner reports for a partner based on information received from one or more client devices.

Further embodiments may include systems for mediation of content-related services. Such systems may include a mediation server for receiving a request concerning a service associated with content played on the client device, determining a set of permissions for the requested service based on a market segment of the client device requesting the service, generating configuration information based on the determined set of permissions, and providing the configuration information for download to the client device. Subsequent configuration of the client device according to the configuration information allows for communication between the client device and a service provider of the requested service in accordance with the set of permissions. Such systems may further include a reporting server configured to receive a report from the client device, the report concerning activity associated with the service and generated in accordance with the set of permissions. Some embodiments further include a mediator management system, an events database, and a partner reports database.

In yet another embodiment of the present invention, computer-readable storage media is provided. Embodied on such computer-readable storage media may be a program that is executable by a processor to perform a method for mediation of content-related services.

Another embodiment includes methods for mediation of content-related services that include sending a mediation request concerning a service associated with content played on the client device, receiving configuration information for download from the mediation server to the client device, the configuration information based on a set of permissions associated with a market segment of the client device requesting the service, configuring the client device based on the configuration information, sending a service request from the client device to a service provider of the service associated with the content, the service request being generated in accordance with a set of permissions, and sending information from the client device to a reporting server concerning activity associated with the service, the information being sent by the client device in accordance with the set of permissions.

DETAILED DESCRIPTION

Figure 1:
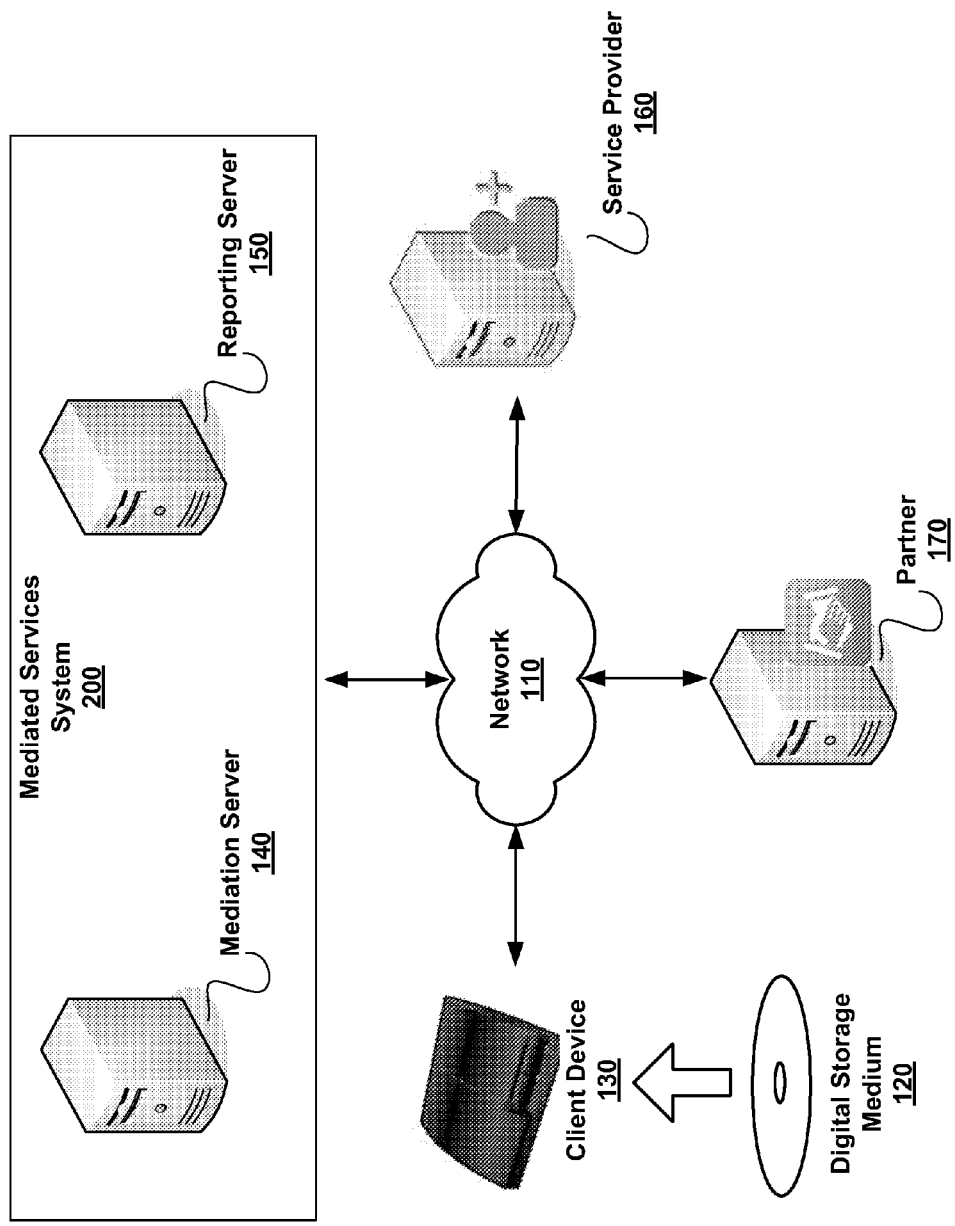
FIG. 1 illustrates a server-client environment for content-related mediation.

FIG. 1 illustrates a server-client environment for content-related mediation 100. In environment 100, a client device 130 is in communication with a mediated services system 200 for content-related services. Client device 130 communicates with the mediated services system 200 via a communications network 110. The environment 100 of FIG. 1 includes a client device 130 capable of playing content such as content embodied on digital storage medium 120 or that might be downloaded from a content provider over network 110, a mediated services system 200 (described further with respect to FIG. 2) including a mediation server 140 and a reporting server 150, a service provider 160, and partner server 170.

Communication network 110 may be a local, proprietary network (e.g., an intranet) and/or may be a part of a larger wide-area network. The communications network 110 may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. Communications network 110 allows for communication between the various components of server-client environment 100.

The digital storage medium 120 of FIG. 1 may include a media storage device such as a CD or DVD. Digital media include information and content that may be accessed on the digital storage medium 120 and executed or 'played' on client device 130 such as a file of content. Digital media may include portions of data or locked or 'secure' data whereby further information and/or interaction with a game server or service provider 160 may be required in order to unlock, access, play, or otherwise use that data.

In some instances, the further information or the content itself may be downloaded over communications network 110. In such an instance, the further information or the downloaded content may be stored in memory at the client device 130 or in some other form of storage device accessible to the client device 130. The content, whether downloaded or accessed from digital storage medium 120, may further include metadata or other information to characterize or classify one content selection from another content selection.

In some instances, the content maintained at client device 130, on the digital storage medium 120, or accessed over communications network 110 may be further associated with certain supplemental data or services such as those developed in conjunction with a service software development kit (SDK). Service providers 160 may use the service SDK to integrate their specific services with a particular content title or selection. Initializing a service SDK may require a determination that a particular service is available to users or players of the content on the client device 130. For example, certain content such as a particular game title may be associated with service from particular service provider(s) 160. That particular service provider 160 may specialize, be licensed, or otherwise technically able to provide a specific service related to the game title. Based on a determination as to the availability of a content-related service and/or a service provider 160 of such a service, a request for service mediation with respect to the content-related service may be sent from the client device 130 to the mediated services system 200.

Client device 130 may be one of any number of different electronic client or end-user devices such as an electronic gaming system, a general-purpose computer, a set-top box, a Blu-Ray® player, or a portable gaming device that may access the content stored on the digital storage medium 120. Client device 130 may be a home entertainment device such as a PlayStation® 3 from Sony Computer Entertainment Inc. as well as any one of a number of portable media devices such as a PlayStation Portable (PSP®), including the PSP® Go system, also from Sony Computer Entertainment Inc. Client device 130 may also be a home media center capable of playing or executing DVDs or CDs as well as other optical, flash, or on-demand media, which may audio-only content in addition to full-motion video and still-frame content. Client device 130 may also include a mobile device such as a cellular phone, a personal digital assistant (PDA), as well as a Netbook (i.e., a miniature laptop computing device).

Client device 130 may be configured to access data from other storage media such as memory cards or disk drives as may be appropriate in the case of downloaded content. A client device 130 is likewise inclusive of any device capable of receiving primary and/or ancillary content over a network or through some other communications operation such as a synchronization operation with another computing device via an ad hoc communications network, storing that content locally at the client device 130 or at a storage device coupled to the client device 130, and exchanging data with a server configured for such exchanges. This may include exchanges with mediation server 140, reporting server 150, and/or server(s) associated with service provider 160 or partner 170.

Each client device 130 may be associated with a unique device identifier. During a use of the client device 130, a user may either manually or through an automatic exchange of data over network 110 register the client device 130 and device identifier with a database or server. The client device 130 may be registered and identified thereafter by reference to the device identifier, a corresponding user identifier, or both. The server may store a device identifier, a corresponding user identifier(s), or both. Client device 130 includes standard computing components such as network and media interfaces, computer-readable storage (memory), and processors for executing instructions that may be stored in memory.

A server like mediation server 140, reporting server 150, and server(s) associated with service provider 160 or partner 170) may be any computing device as is known in the art, including standard computing components such as network and media interfaces, computer-readable storage (memory), and processors for executing instructions that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Requests for mediation of content-related services provided by service providers (e.g., service provider 160) may be sent to mediated services system 200, which as illustrated in FIG. 1, includes a mediation server 140 and a reporting server 150. Requests for mediation may include "tokens" or other data reflective of certain information, including information about the client device 130 and about service provider 160. This information may include a device identifier, geographic region of the device, type of service, service provider identifier, and particular configuration information related to the device and/or service provider. The aforementioned "tokens" or information included as a part of a mediation request may further include information related to user(s) of the client device 130 such as a user identifier, network address, and geographic location as well as information related to the content being executed or 'played' on client device 130 and as may be indicated through a game title or other title identifier. The "token" may further concern information related to a requested service or designated service provider 160 as may occur through a service identifier.

Tokens may be updated as the information associated with the token is updated as tokens may be dynamic. Based on the information provided in a mediation request, the mediation server 140 may authenticate the user and/or the client device 130. The data received from a client device 130 may also be cryptographically signed to verify the identity of client device 130, identity of a user of the client device 130, and/or integrity of the data related to the mediation request. The information provided as a part of a mediation request and a corresponding token may also be used by the mediation server 140 to determine a set of permissions and provide the set of permissions and, if required, configuration information for the client device 130. Based on the set of permissions and/or provisioning of configuration information, the client device 130 may access the requested service to be provided in accordance with the corresponding set of permissions.

The set of permissions determined for client device 130 may be based on market segment information indicated by information included in the mediation request. A market segment may refer to geographic location, region, type of client device 130, user information, and various combinations of the foregoing. For example, a particular service option may be only available to users—more specifically, the client devices 130 of those users—in a particular geographic location.

Alternatively, there may be multiple service providers for the requested service, or a service provider 160 may be associated with multiple distributors, network addresses, or uniform resource locators (URLs). In such an instance, a service provider 160 or distributor/network address/URL is assigned to the client device 130 based on, at least, the market segment information, which may include geographic location. The mediation server 140 generates configuration information based on whether the client device 130 is in that geographic location. Alternatively, a service may only be available on certain client devices 130 such as brand, model, or presence of peripheral devices, or to users of a certain age.

Mediation server 140 may also send configuration information to the client device 130. Such configuration information may apply the set of permissions to an identified service provider 160, including communications with the identified service provider 160, how the requested service is provided, and associated service option(s). Configuration of the client device 130 according to the configuration information allows for communication to commence between the client device 130 and service provider 160. More specifically, implementation of the configuration information allows for the requested service to be provided to the client device 130 in accordance with the corresponding set of permissions.

In addition to allowing for the client device 130 to receive the service from the service provider 160, the set of permissions may also determine what information is tracked and provided to reporting server 150 with respect to activity associated with the service. For example, a service may include providing ancillary content such as advertising for display in a particular game or movie title to a user of the client device 130. Such ancillary content may be specifically associated with particular primary content or title.

Activity involving the ancillary content, such as user-generated data concerning advertisement impressions or interactions with the ancillary content, or other service activity results such as successful delivery and introduction of ancillary content into a game title, may be tracked and delivered to reporting server 150. Reporting of this information may be based on the set of permissions embodied in the configuration information and determined by the mediation server 140.

The set of permissions may indicate parameters for tracking and evaluating advertising impressions for advertising services whereby a game character must be within a certain distance or interact with an advertisement for an impression to count. Alternatively, a service provider 160 may be dedicated to monitoring user activities that are related to a particular content title. With respect to a game title, the information gathered via such monitoring may include level progression, item interaction, and other gameplay behaviors. The set of permissions and/or other mediation data may indicate whether or not such monitoring applies and if so, the parameters defining the particular activities to monitor based on the particular game title.

The set of permissions may further specify reporting parameters regarding sampling and aggregation frequency. Information may aggregated and reported in real-time, hourly, daily, weekly, monthly, on-demand, or upon achieving a benchmark. The set of permissions may be further based on various factors including user information or specific aspects as they concern the administrator(s) of the mediated services system 200, the service provider(s) 160, and/or partner(s) 170.

A partner 170 may be any entity with a business interest in receiving information regarding a mediated service. For example, an advertising service provided by a service provider 160 may include delivering advertising for display in a particular video game environment. The subject of such advertising, however, may be the product(s) or service(s) of a partner 170 that originated the advertising buy for distribution to client devices 130. The partner 170 may therefore also be interested in seeing information concerning such advertising. While a particular service provider 160 may wish to track indicators regarding its own services generally, partner 170 may be interested in information regarding advertising related to their products and services. As such, mediated services system 200 may wish to track various types of information regarding services provided by multiple service providers 160 for quality control and verification purposes, for example. Such information may be processed and included in compilations sent to the service provider s160 and partners 170.

In this context, information regarding the user activity, interaction, and/or feedback with a service is collected at client device 130 and reported to reporting server 150 in accordance with the set of permissions. Reporting server 150 receives the information from the client device 130, which can then be used to generate various compilations of information for various parties such as service providers 160 and partners 170. A reporting server 150 may further collect information sent by service providers 160 regarding the services provided and any activity on the side of the service provider 160.

Such compilations may include some or all of the information collected, depending on various parameters. For example, a service provider 160 may be specifically interested in information pertaining to a particular game title. The information collected by reporting server 150 may also be used to verify and confirm information regarding transactions between client devices 130 and mediated service providers 160.

The reporting server 150 may encompass or communicate with multiple reporting servers that receive and handle reports from various parties. For example, one particular reporting server may receive reports from client devices, while another server may receive reports from service providers. Each type of server may be further specialized based on the type of device with which they communicate. For example, the set of permissions may specify different reporting parameters based on the type of device. The set of permissions may therefore specify that a client device send reports in real-time, while a service provider may send bulk or aggregated reports at specified intervals. A reporting server in communication with a client device may require different capabilities than a reporting server in communication with a service provider. Such information in the received reports may be further processed, compared, combined, and analyzed to produce digests, summaries, samples, analyses, and/or other types of compilations for the various parties discussed above. In some embodiments, the compilations may be generated by a separate device, such as a compilation generator 230 as illustrated in FIG. 2.

Figure 2:
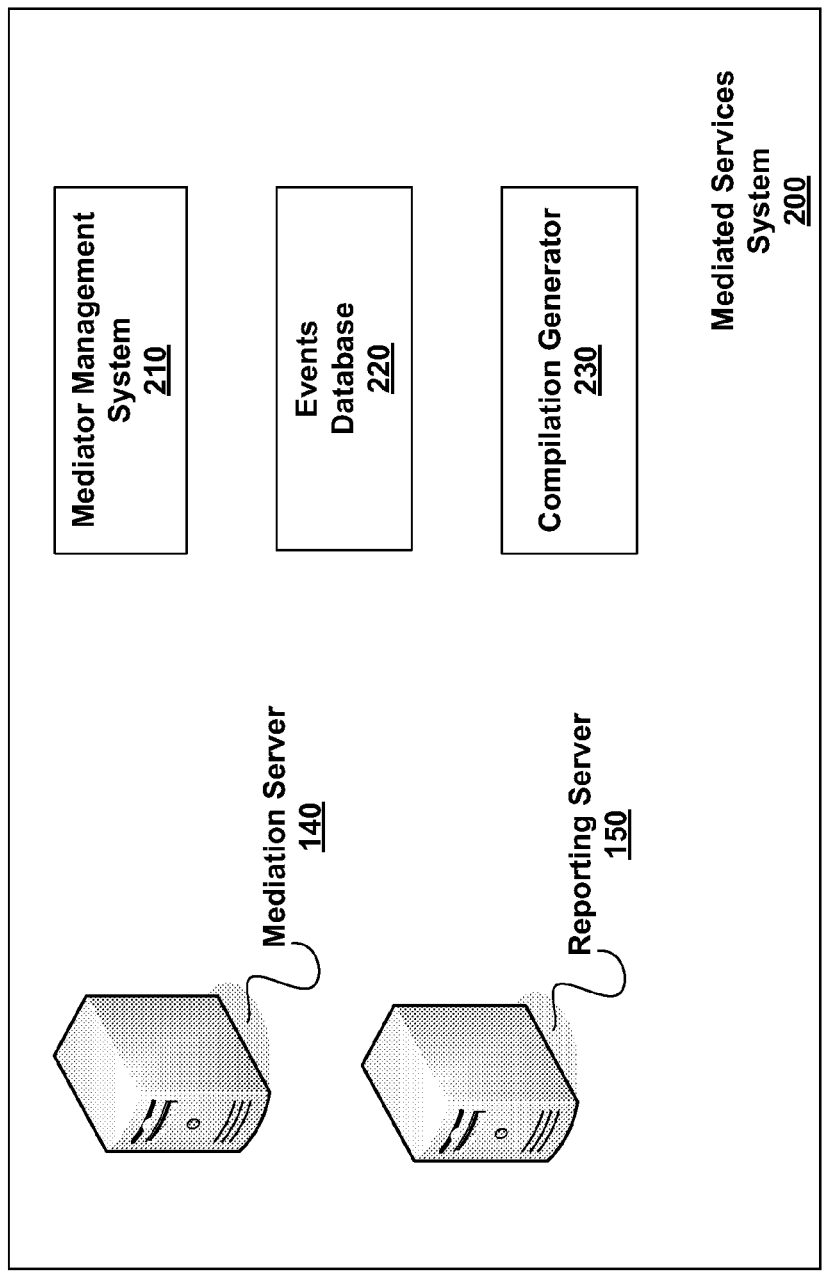
FIG. 2 illustrates an exemplary system for mediation of content-related services.

FIG. 2 illustrates an exemplary system 200 for mediation of content-related services. Mediated services system 200 includes mediation server 140 and reporting server 150, which were initially described in the context of FIG. 1. Mediated services system 200 may optionally and further include a mediator management system 210, an events database 220, and a compilation generator 230.

Mediator management system 210 provides an interface for an administrator of the mediated services system 200 to enter and propagate updates throughout a network implementing content mediation. An update may concern content titles, mediation and/or configuration data, permissions, as well as information related to service providers and distributors.

For example, a partner may wish to terminate an advertising campaign. An administrator of mediated services system 200 may use mediator management system 210 to update the sets of permissions, such that any client devices 130 that are currently receiving or requesting advertising may be prevented from receiving advertisements included in the designated advertising campaign. The update is sent to the client device 130 and executed in real-time or close to real-time, such that the advertising campaign can be terminated accordingly. Updates involving reporting parameters may similarly be propagated to client devices 130 and other components of mediated services system 200.

Events database 220 stores information regarding various events related to the service provided by service provider 160 such as advertising impressions for advertising services whose services are mediated by mediated services system 200. For example, a particular advertisement may be associated with certain tags, metadata, or properties. Such information may be used to categorize and control a particular advertisement, as well as collect and track information related to such advertisement. A set of permissions may further use such information to control advertising services provided to a certain client device 130.

Events database 220 may also encompass a catalog and/or management system for content-related assets provided as part of the service. Referring to the example discussed above, events database 220 may also be used to streamline the development process of advertisements—from prototyping to quality assurance to full production. Such an implementation of events database 220 may also store information specific to each advertisement and received from reporting server 150 in the form of incoming reports from various client devices 130 and service providers 160 in the network.

Mediation server 140 or mediation management system 210 may refer to events database 220 to selectively control and update how certain services are performed. For example, a set of permissions or permissions update may involve blocking certain advertisements in a designated geographic area. That parameter may be propagated from the mediation management system 210. Mediation server 140, in consultation with events database 220, may then determine the set of permissions for types of advertisements that a particular client device 130 can receive. The set of permissions may be expressed in terms of tags, metadata, or properties associated with a particular advertisement and stored in memory. Any updates may involve editing or eliminating tags or metadata associated with an advertisement. The set of permissions may also be edited to reflect different permissions associated with such tags, metadata, and properties.

Mediated services system 200 may further and optionally include a compilation generator 230, which may be part of, affiliated with, or operate in conjunction with reporting server 150 described above. As discussed above, reporting server 150 may be a specialized device for receiving information from service providers 160 regarding the services provided to various client devices 130 and user activity associated with the services. The compilation generator 230 may use information from reports received or stored at reporting server 150, the events database 220, or at the actual compilation generator 230 to generate information compilations for recipients such as service providers 160 and partners 170. The data in such compilations may be aggregated and analyzed according to recipient-specific parameters.

Figure 3:
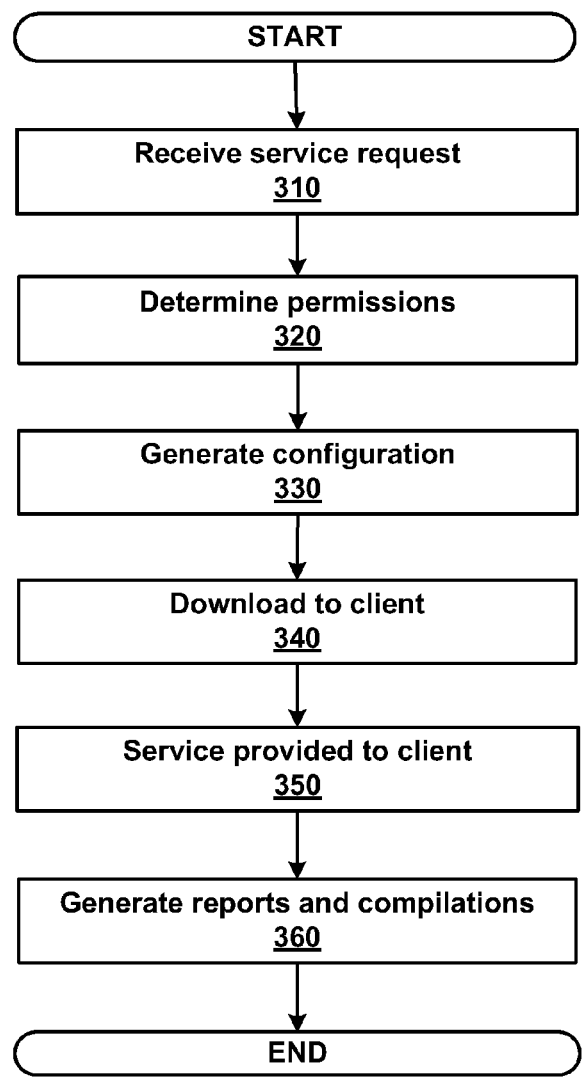
FIG. 3 illustrates a method for mediation of content-related services.

FIG. 3 illustrates a method 300 for mediation of content-related services. In method 300, a service request is received from a client. Permissions are then determined and a client configuration is generated and delivered to the client. Following configuration of the client in response to the configuration information, the client begins to receive the corresponding service from a service provider and generates reporting information related to the received services. The information in such reports may be used to generate reports for partners working in conjunction with the service providers.

In step 310 of FIG. 3, a request for service is received by mediation server 140. The request for service may be generated by a client device 130 playing content and that subsequently initializes a service SDK. Initialization of the SDK allows for generation of a request to a mediated services system 200 regarding a service associated with the content.

The request may include a user identifier, a device identifier, a service identifier, or some other form and/or combination of identifying information. The identifiers may be embodied in a "token," which may further indicate geographic location or region, user age, or title being played. The user or client device 130 may be identified and/or authenticated based on the information in the request.

Based on the information included in the received request, a set of permissions is determined in step 320 of FIG. 3. The set of permissions may be based on market segment, which may be defined differently among various titles of content that can be played on client device 130 and services associated with such titles. For example, a market segment may refer to geographic region, such that a service provided to users in one region may differ from a corresponding service provided to users in another region. The set of permissions may also designate a certain service provider 160, distributor of the service provider 130, address, and URL.

In step 330, configuration information may be generated by mediation server 140 based on the determined set of permissions. Using the previous example, a client device 130 may have been determined to be located in geographic region 'one,' which is not allowed to receive advertisements for pharmaceuticals/drugs. The set of permissions determined for the client device 130 would therefore indicate that client device 130 be prevented from displaying the banned advertisements in the content title. Other advertisements, however, may be allowed under the set of permissions.

In some instances, the request sent in step 310 indicates a present configuration of the client device 130. Mediation server 140 may use such information to determine what configuration information needs to be generated to permit communication between the client device 130 and an identified service provider 160 of the requested service. In some instances, configuration information may be pre-generated and selected based on the determined permissions. Configuration information may thus be selected from a catalog rather than generated for each requesting client. Such configuration information may provide for allowing/disallowing communicating with service providers 160 or disabling/enabling the service or specific features of the service. Configuration may also include allowing/disallowing reporting regarding service-related activities, parameters for any reports, and designating recipients for any reports, including any recipient-specific parameters.

In step 340, the configuration information is provided to the requesting client device 130 in response to the request sent in step 310. The client device 130 may then be configured based on the configuration information. Once the client device 130 is configured, communication can commence between the client device 130 and a service provider 160 of the service requested in step 310. Such communication is, however, governed according to the set of permissions so that banned advertisements, for example, are blocked or prevented from being received or displayed on client device 130.

In step 350, the requested service is provided to client device 130 by service provider 160. Providing such services may include communication of certain data, applications, and content from service provider 160 to the client device 130.

In step 360, reports are received at reporting server 150, and compilations are generated by compilation generator 230 based on the reports. Reports are sent from the client devices 130 and service providers 160 in the network to the reporting server 150. The information from such reports may then be compared against each other, verified, analyzed, and compiled into compilations by compilation generator 230. The compilations may be generated for service providers 160 or partners 170 based on parameters specific to the recipient.

The present invention may be implemented in an application that may be operable using a variety of end user devices. The present methodologies described herein are fully intended to be operable on a variety of devices. The present invention may also be implemented with cross-title neutrality wherein an embodiment of the present system may be utilized across a variety of titles from various publishers.

Computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for mediation of content-related services, the method comprising:

receiving a request sent from a client device to a mediation server, the request concerning a service, the requested service being related to content played on the client device;

executing instructions stored in memory of the mediation server, wherein execution of the instructions by a processor of the mediation server generates configuration information based on a market segment of the client device requesting the service; and providing the configuration information for download to the client device, wherein configuration of the client device based on the configuration information allows for communication between the client device and a service provider of the requested service in accordance with the configuration information.

2. The method of claim 1, wherein the configuration information is generated based on a set of permissions associated with the market segment of the client device.

3. The method of claim 2, wherein configuration of the client device based on the configuration information further allows for communication of a report from the client device to a reporting server in accordance with the set of permissions, the report concerning client device activity associated with the service.

4. The method of claim 3, further comprising sending a compilation of information to a partner, the compilation based on one or more reports regarding the service.

5. The method of claim 3, further comprising sending a request for a report, the request being sent to the client device, wherein the report is generated by the client device in response to the request.

6. The method of claim 2, wherein the content includes metadata associated with the set of permissions.

7. The method of claim 2, further comprising updating the set of permissions and providing the update to the client device, wherein communication between the client device and the service provider is governed in accordance with the updated set of permissions in or close to real-time.

8. The method of claim 1, wherein the service includes managing a transfer of supplemental content to or from the client device, the supplemental content being related to the content played on the client device.

9. The method of claim 8, wherein the supplemental content includes advertisements.

10. The method of claim 8, wherein the supplemental content is user-generated.

11. The method of claim 8, wherein the supplemental content is provided by one or more service providers.

12. A system for mediation of content-related services, the system comprising:
a mediation server configured to
receive a request sent from a client device, the request concerning a service provided by a service provider, the requested service being related to content played on the client device,
generate configuration information for the requested service, the configuration information based on a market segment of the client device requesting the service, and
provide the configuration information for download to the client device, wherein configuration of the client device based on the configuration information allows for communication between the client device and a service provider of the requested service in accordance with the configuration information; and
a reporting server configured to receive a report from the client device, the report concerning activity associated with the service and generated in accordance with the configuration information.

13. The system of claim 12, wherein the configuration information is generated based on a set of permissions associated with the market segment of the client device.

14. The system of claim 13, further comprising a mediation management system configured to receive an update regarding determination of the set of permissions and provide the update to the mediation server for transmission to the client device, wherein communication between the client device and the service provider is governed in accordance with the updated set of permissions in or close to real-time.

15. The system of claim 12, further comprising a partner reports server configured to compile a report for a partner based on information in one or more reports received by the reporting server.

16. The system of claim 12, further comprising an events database configured to store information regarding events based on one or more reports received by the reporting server, the events being related to the service.

17. A computer-readable storage medium, having embodied thereon a program, the program being executable by a processor to perform a method for mediation of content-related services, the method comprising:
receiving a request concerning a service associated with content played on a client device;
generating configuration information for the requested service, the configuration information based on a market segment of the client device requesting the service; and
providing the configuration information for download to the client device, wherein configuration of the client device based on the configuration information allows for communication between the client device and a service provider of the requested service in accordance with the configuration information.

18. The computer-readable storage medium of claim 17, wherein the configuration information is generated based on a set of permissions associated with the market segment of the client device.

19. The computer-readable storage medium of claim 18, wherein configuration of the client device based on the configuration information further allows for communication of a report from the client device to a reporting server in accordance with the set of permissions, the report concerning client device activity associated with the service.

20. A method for mediation of content-related services, the method comprising:
sending a mediation request from a client device to a mediation server, the mediation request concerning a service associated with content played on the client device;
receiving configuration information for download from the mediation server to the client device, the configuration information based on a market segment of the client device requesting the service;
executing instructions associated with the configuration information, wherein execution of the instructions by a processor of the client device configures the client device based on the configuration information; and
sending a service request from the client device to a service provider of the service associated with the content, the service request being generated in accordance with the configuration information.

21. The method of claim 20, wherein the configuration information is generated based on a set of permissions associated with the market segment of the client device.

22. The method of claim 21, further comprising sending a report from the client device to a reporting server concerning activity associated with the service, the report being sent in accordance with the set of permissions.

23. The method of claim 21, further comprising receiving an updated set of permissions, wherein communication between the client device and the service provider is governed in accordance with the updated set of permissions in or close to real-time.

24. A computer-readable storage medium, having embodied thereon a program, the program being executable by a processor to perform a method for mediation of content-related services, the method comprising:
sending a mediation request, the mediation request concerning a service associated with content played on a client device;
receiving configuration information for download to the client device, the configuration information based on a market segment of the client device requesting the service;

configuring the client device based on the configuration information; and sending a service request for the service associated with the content, the service request being generated in accordance with the configuration information.

25. The computer-readable storage medium of claim 24, wherein the configuration information is generated based on a set of permissions associated with the market segment of the client device.

26. The computer-readable storage medium of claim 25, wherein the program is further executable to generate and send a report in accordance with the set of permissions, the report concerning client device activity associated with the service, the service being provided in response to the service request.

* * * * *